United States Patent [19]
Nichols

[11] B 3,983,415
[45] Sept. 28, 1976

[54] SEMICONDUCTOR SWITCHING CIRCUIT
[75] Inventor: Herbert F. Nichols, San Jose, Calif.
[73] Assignee: Joel Bauman, San Francisco, Calif.
[22] Filed: July 29, 1974
[21] Appl. No.: 492,688
[44] Published under the second Trial Voluntary Protest Program on January 20, 1976 as document No. B 492,688.

Related U.S. Application Data
[62] Division of Ser. No. 295,448, Oct. 6, 1972, Pat. No. 3,851,528.

[52] U.S. Cl. .............................. 307/255; 307/313; 307/29; 307/77; 323/25
[51] Int. Cl.² ...................... H03K 17/60; G05F 3/00
[58] Field of Search ............ 307/255, 296, 313, 18, 307/19, 21, 24, 25, 28, 29, 71, 72, 75, 77, 85; 323/23, 25

[56] References Cited
UNITED STATES PATENTS

| | | | |
|---|---|---|---|
| 3,225,218 | 12/1965 | Cochran | 307/313 |
| 3,600,603 | 8/1971 | Watanabe | 307/255 |
| 3,646,428 | 2/1972 | Torok | 323/23 |
| 3,649,851 | 3/1972 | Cohen | 307/255 |

Primary Examiner—Michael J. Lynch
Assistant Examiner—B. P. Davis
Attorney, Agent, or Firm—C. Michael Zimmerman

[57] ABSTRACT

An electronic thermometer is described that is useful for obtaining oral or rectal body temperatures. The thermometer includes a casing on which is mounted a scale for visually indicating temperature readings. A plug-in connector is used to connect an electrical cord to the casing. Such cord terminates in a disposable semiconductor junction through which a constant current is made to flow so that the voltage developed across it is dependent upon its temperature in a straight line function. The casing encloses small operating batteries and low power consumption circuitry for providing the constant current flow through the semiconductor junction and translating voltage changes developed across it into temperature readings.

2 Claims, 2 Drawing Figures

Fig_1

SEMICONDUCTOR SWITCHING CIRCUIT

This is a division of application Ser. No. 295,448, filed Oct. 6, 1972, now U.S. Pat. No. 3,851,528.

BACKGROUND OF THE INVENTION

The present invention relates to a semiconductor switching circuit and, more particularly, to such a simplified circuit which insures uniform improved switching action where two lines of opposite polarity must be switched.

Electronic thermometers which rely on electrical transducers to register temperature changes have been devised. However, for various reasons none of such electronic thermometers available to date have been able to successfully compete with the common mercury-in-glass thermometer. Such thermometers are, in general, not only relatively expensive, but also bulky and not an easy to carry as glass thermometers. Those that are portable generally rely on batteries which must be frequently recharged for their operation and are relatively complex to operate.

SUMMARY OF THE INVENTION

The present invention provides a semiconductor switching circuit when is useful in an electronic thermometer. In its most basic aspects, the thermometer includes as its temperature probe, a component having an electrical characteristic, such as its resistance to current flow, which is dependent in a predetermined manner on the temperature of such material; a small portable casing which encloses circuitry for translating variations in such electrical characteristic into temperature readings; indicating means, such as a meter scale on the casing, connected with the circuitry for displaying the temperature readings; and a probe cord connected between the probe and the circuitry for conveying changes in the electrical characteristic of the probe material to the circuit.

The circuitry included as part of the thermometer for registering variations in the electrical characteristic of the component and translating such variations to temperature readings is especially designed to require low power and yet maintain accurate readings at all times. In this connection, the circuit utilizes low-powered operational amplifiers in providing its various functions. As a particularly important aspect of such circuit, it includes a semiconductor switch for simultaneously connecting the separate terminals of two d.c. potentials of opposite positive and negative polarities to a load with a single pole of a switch. Such circuit relies on the simultaneously turning on of two oppositely polarized transistors to connect the respective d.c. potentials to the load.

As will be described or will become apparent from the following description of a preferred embodiment, the electronic circuit of the invention includes many other features which are important in the combination.

BRIEF DESCRIPTION OF THE DRAWINGS

With reference to the accompanying two sheets of drawings.

DESCRIPTION OF THE PREFERRED EMBODIMENT

Figure 1:
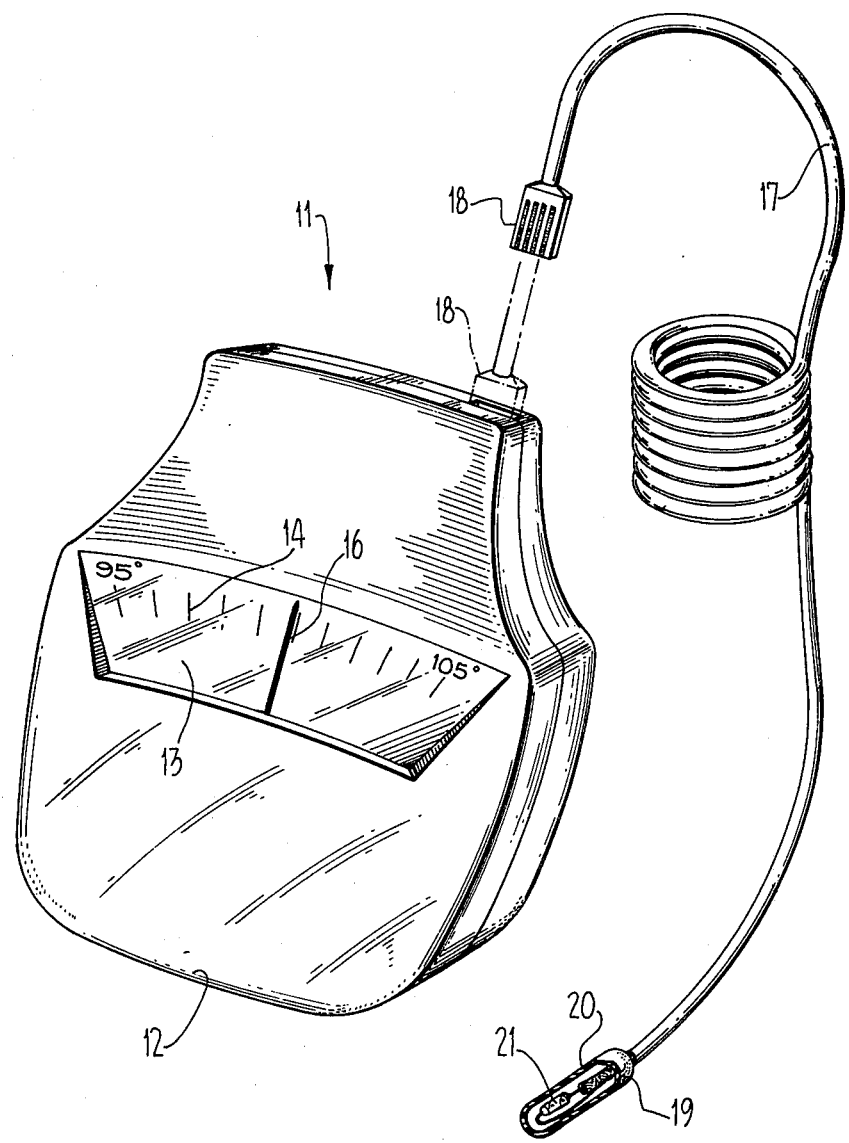
FIG. 1 is an enlarged perspective view of an electronic thermometer incorporating the circuit of the invention.

With reference first to FIG. 1, a preferred electronic thermometer incorporating the circuit of the invention is generally referred to by the reference numeral 11. The showing in FIG. 1 is somewhat enlarged— the instrument is actually sized to easily fit within the shirt pocket of a nurse or the like who is apt to have continual use for the same. The thermometer 11 includes a casing 12 having an indicator 13 mounted on it for visually displaying temperature readings. Such indicator 13 is in the form of a temperature scale 14 having markings covering the range of between, for example, 95° and 105°F, and a moveable needle indicator 16 for alignment with specific temperature indicia on the scale 14.

The electronic thermometer 11 is completely self contained. That is, the casing 12 encloses the circuitry for controlling the needle 16 and also the batteries for powering such circuit and the temperature probe of the thermometer. In this connection, a probe cord 17 is connected to the circuitry within the casing via a disconnectable plug 18. As is illustrated, the cord 17 is flexibly coiled so that when the thermometer is not in use, the cord is compact for ease in handling.

A temperature probe 19 is provided on the free end of the cord 17. Such probe is in the form of a small semiconductor diode 21 which is physically and electrically shielded from the surrounding environment by a thin sheath 20 of, for example, aluminum. As is known, the resistance of a semiconductive junction varies with the temperature of such junction. This phenomenon is utilized to provide an exceptionally accurate and inexpensive low power probe. More particularly, it has been found that if the flow of current through a semiconductor junction is maintained constant at a selected value, the voltage developed across the junction will be proportional to the temperature of the junction in an accurate straight line function. Thus, if current flow through a diode is maintained constant, measurement of changes in the voltage developed across the diode will provide a measurement of a temperature changes in such diode. And because a diode has a low mass and consequent low heat capacity, its temperature quickly reflects the temperature of its surroundings.

Figure 2:
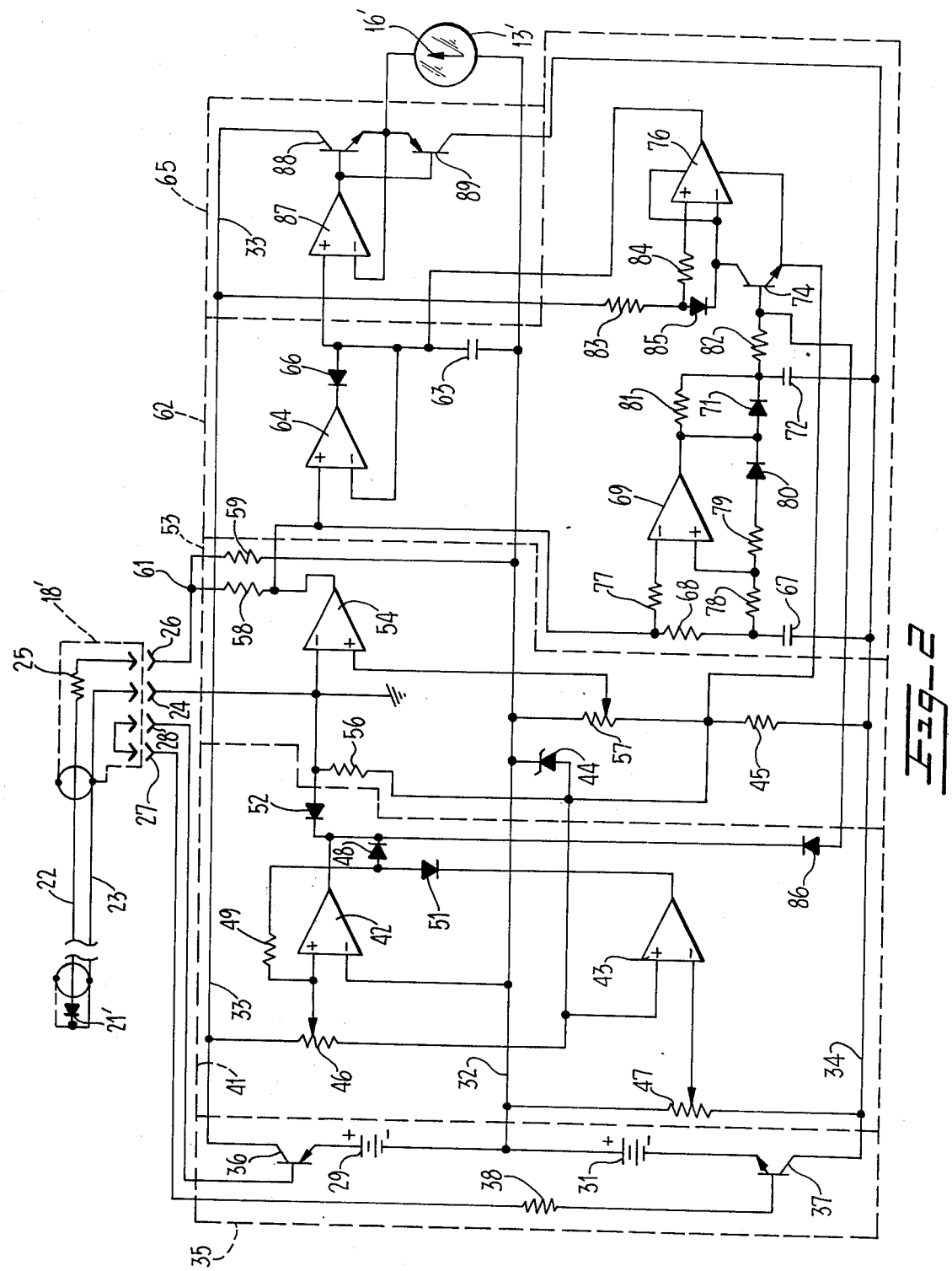
FIG. 2 is a simplified electrical schematic diagram of the thermometer of FIG. 1.

The diode probe is represented in the electrical diagram of FIG. 2 by the reference numeral 21'. As is illustrated, the input to such diode is provided by a shielded wire 22, through a resistor 25. The resistor 25 is provided for the purpose of matching the individual probe and cable combinations to the circuitry for a selected constant value of current flow. The return path for current flow is through the shielding 23. Both the lead 22 and the shielding 23 are part of the probe cord 17.

The disconnectable plug 18 is represented in FIG. 2 by the dotted line enclosure 18'. Such plug not only includes contacts 24 and 26 for connecting the temperature probe to the circuit within the casing, but also includes contacts 27 and 28 which act, in effect, as a single pole switch for connecting the serially connected batteries 29 and 31 to the remainder of the circuit. That is, such batteries are only connected to the circuit when the probe cord is in place. It is therefore an easy matter to prevent the circuit from being needlessly energized by the batteries to the detriment of their power whenever the thermometer is not being used, by merely disconnecting the plug 18 from the casing.

It will be noted that the two serially connected batteries 29 and 31 have their common connection (the positive terminal of battery 31 and the negative terminal of battery 29) connected to the circuit via a lead 32, hereinafter referred to as the circuit common lead or bus. The positive terminal of battery 29 is connected to the circuit via a positive power bus 33, and the negative terminal of battery 31 is connected to the circuit via a negative power bus 34. This type of connection of two serially connected direct current power sources to a circuit to be energized is typical of many electronic circuits, particularly those employing operational amplifiers. In general, the two power sources in an arrangement of this type are connected and disconnected from the remainder of the circuit by a double-pole type switch. Such a switch cannot, however, be relied on to always apply the power simultaneously to the circuit leads, such as the buses 33 – 34. Variations in the time at which the various leads of a circuit are connected to power can result in substantial deleterious transient effects in the circuit.

As a salient feature of the thermometer, a semiconductor switching circuit is provided for simultaneously connecting the buses 33 – 34 to the positive terminal of battery 29 and the negative terminal of battery 31, respectively, with a single pole switch as represented by the contacts 27 and 28. The batteries and this portion of the total circuit are set apart by the dotted line block 35. More particularly, a pair of transistors 36 and 37 are each connected between an associated one of the batteries 29 and 31 and one of the circuit buses 33 and 34, respectively. The transistor 36 is of the PNP type, whereas the transistor 37 is the NPN type. Thus, each of the transistors is connected between its associated battery and circuit buses in the direction of normal current flow through such transistor. Moreover, as illustrated, the emitter of PNP transistor 36 is connected to the positive terminal of battery 29 and its collector is connected to the bus 33, whereas the emitter of NPN transistor 36 is connected to the negative terminal of battery 31 and its collector is connected to bus 34.

As is illustrated, the bases of the transistors are connected to one another through a resistor 38 and the single pole switch represented by the contacts 27 and 28. The resistance of resistor 38 is such that at the lowest useable voltage of the batteries, the base current generate by the circuit in each of the transistors will be more than sufficient to drive the transistors into saturation at the maximum operating current of the electronic thermometer circuit. The result is that upon closure of the switch represented by the contact 27 and 28, both of the transistors will be driven into saturation at substantially the same instant. This will, in effect, switch the batteries 29 and 31 into the circuit simultaneously. Thus, the inconsistencies and time delays inherent in double pole mechanical switches are avoided. The only difference in the time in which the differing potentials represented by batteries 29 and 31 are connected into the circuit will be due to the switching time differences between the PNP and NPN transistors. This potential time variation is much smaller than that which can be expected with a mechanical double pole switch. Moreover, any such variation will be consistent at all times so that, if necessary, compensation for it can be made.

Most desirably, the emitter to base reverse breakdown voltage of each of the transistors is in excess of the potential of the battery associated with the other transistor. Thus, if either or both of the batteries are installed incorrectly so as to reverse the polarity from that desired for the circuit, one or both of the base-emitter junctions will become reverse biased at a potential below the reverse breakdown voltage. This will reduce the reverse current going into the circuit to essentially zero, and thus will protect it from receiving power of reverse polarity. In this connection, polarity as used herein is measured from the potential on common bus 32 considered at zero potential.

The circuit of the electronic thermometer also includes means for automatically preventing erroneous operation of the electronic thermometer, i.e., inaccurate readings on the temperature scale, due to weak battery conditions. In this connection, it should be noted that although there are now available compensation circuits for maintaining accurate readings as a battery's voltage output diminishes, such circuits are not effective after the power of the battery reaches a certain low level.

The automatic battery cut-off portion of the circuit is included within the dotted line block 41. Such battery cut-off circuit includes operational amplifiers 42 and 43 respectively associated with the batteries 29 and 31. Such amplifiers act, in combination with diodes to be discussed, as means for both detecting when the associated battery reaches a predetermined reduced level below which erroneous readings may be expected, and as means for supplying a predetermined potential to the circuit to drive the indicator needle off scale and thereby indicate such reduced potential condition of a battery. Each of the amplifiers accomplishes this by first comparing the output voltage of its associated battery with a constant reference voltage. In this connection, a zener diode 44 is included with a resistance 45 to act as a constant voltage source. As shown, the positive primary input terminal of amplifier 42 is connected through a potentiometer 46 to the positive output of the battery 29 via circuit bus 33. The operational amplifier 43 is similarly connected across the battery 31, except that it is the negative output of battery 31 which is connected through a potentiometer 47 to its negative primary input terminal for comparison with a constant negative reference voltage provided by connecting its positive primary input terminal to the negative side of zener diode 44.

The positive and negative reference voltages applied respectively to the amplifiers 42 and 43 are chosen to be of lower magnitude than the positive and negative outputs of the batteries 29 and 31 when the powers of such batteries are in the operating range. Moreover, each potentiometer 46 and 47 is adjusted to provide its associated amplifier with an initially saturated positive output voltage when the batteries are at full potential (fresh). The particular voltage chosen via each potentiometer to be applied to the variable input terminal of each amplifier will depend on the predetermined low battery power level chosen to be the cut-off level. That is, the resistance provided by each potentiometer should be such that when the battery associated therewith reaches the desired cut-off potential, the voltage difference applied to the comparing input terminals of the associated operational amplifier will become zero.

It will be recognized that with the above arrangement, as each of the batteries weakens, the absolute value of the voltage difference applied through the potentiometer to the comparing input terminals of its associated operational amplifier will be correspondingly reduced toward zero. Until such zero potential difference is reached, the output terminal of amplifier 42, for example, is more positive than its positive input terminal. Thus, the diode 48 is reverse biased and essentially disconnects the feedback loop through resistance 49 from the output to such positive input terminal. However, upon the output terminal going slightly beyond zero to a negative condition, the diode 48 becomes forward biased and closes the positive feedback path around the amplifier. The result is that the amplifier rapidly drives itself into negative output saturation. Because of the circuitry to be described, this will immediately cause the needle (represented in FIG. 2 at 16') on the indicator 13' to be driven off scale. Moreover, the output of amplifier 42 will be held at negative saturation even if the voltage on its positive input terminal were to raise, i.e., the batteries were to show a spurt of additional power. Thus, the cut-off circuit not only initially drives the needle off scale when a low battery condition exists, but also maintains it there as long as the batteries are connected in the circuit to assure that no erroneous readings are obtained.

It will be noted that the output of amplifier 43 associated with battery 31 is connected through a diode 51 to the feedback path of amplifier 42. Thus, a condition of negative saturation on the output of amplifier 43 caused by the negative voltage provided by battery 31 on its negative input terminal becoming slightly positive with respect to its positive input terminal will be applied through the diode 51 and resistor 49 to the positive input terminal of amplifier 42. This will force the output of amplifier 42 to negative saturation as discussed above, which output is connected to the remainder of the circuitry. The amplifier 43 then provides, in effect, the same function for battery 31 as amplifier 42 provides for battery 29.

The output of amplifier 42 is connected through an isolating diode 52 to a measuring circuit set off in FIG. 2 by the dotted line block 53. Circuit 53 performs the actual measurement of voltage changes across the temperature probe diode 21' caused by temperature changes. As one of the most salient features of the instant invention, the measuring circuit has only one operational amplifier for providing both a constant current through the diode 21' and for amplifying voltage changes thereacross for appropriate operation of the indicator. More particularly, a feedback operational amplifier 54 is shown with its primary input terminals connected with the zener diode 44 so as to provide a constant voltage differential across the resistor 56 and, hence, constant current flow therethrough. That is, the negative (inverting) input terminal of the amplifier 54 is connected through the resistance 56 to the negative side of the diode 44, and the positive (noninverting) input terminal of the amplifier is connected through a potentiometer 57 across such zener diode. As will be recognized, this, together with the negative feedback connection, will enable the required voltage differential across resistance 56 to be initially selected for a chosen constant current flow through the temperature probe.

The feedback connection of the operational amplifier from its output to its negative input terminal passes through the temperature probe 21. More particularly, a resistance 58 is provided in series with the probe assembly which is between the output of the amplifier and its negative input terminal. Because of the relatively constant voltage difference applied between the ends of the resistance 56, this feedback connection through the diode will result in the desired constant current flow therethrough whenever the circuit is operating. Thus, because of the constant current flow in the diode 21' whenever the resistance of the semiconductive material making up the diode 21' changes due to temperature changes, the voltage on the output of amplifier 54 will proportionately change to indicate such change. Because of the particular circuit relationships shown, the voltage change on the output of the amplifier will be inversely proportional in a straight line function to temperature changes on the probe diode. That is, as the temperature of the probe increases, the output voltage of amplifier 54 will move in a negative direction a proportionate amount.

As mentioned before, the amplifier 54 acts in combination with certain passive components to not only provide the constant current as discussed, but also to amplify the voltage change on its output caused by a temperature change. More particularly, a second resistance 59 is connected between the constant potential provided by the common bus 32 and a point 61 between the resistance 58 and the probe assembly. By appropriately selecting the ratio of the resistances 58 and 59, the voltage changes produced on the output of the amplifier 54 will be amplified compared to what they would be if the connection including resistance 59 where omitted. To appreciate this, it must be recognized that the current at the common connection 61 of the two resistances 58 and 59 to the diode 21' is maintained constant at all times because of the amplifier feedback connection. By making resistance 59 substantially smaller in value than resistance 58, the great majority of the current supplied at the connection 61 will be provided by the common bus 32. This will result in a larger variation in the output voltage of the amplifier 54 having to be applied through the resistance 58 to compensate for any change in the current flow through the resistance 59 caused by a change in the resistance of the semiconductive material 21'. Thus, the output of the amplifier 54 is an amplification of the voltage which would be required to maintain the current through the semiconductive material constant in the absence of the two resistance arrangement. The combination with the amplifier 54, then, of the three resistances 56, 58 and 59 in the circuit as described results in the amplifier providing the desired voltage amplification as well as a constant current through the temperature probe diode.

Most desirably, the point of zero potential across the meter is chosen to be representative of a temperature reading which is within the selected temperature range displayed on the indicator. Thus, whenever the probe is connected through the plug 18 to the circuitry, if the circuitry is operating, the needle will, in general, move. However, if the circuit is not operating, the needle will not move. Thus a user has a readily available visual check on whether or not the circuitry is in operation when the probe cord is initially connected to the circuit.

The circuit of the electronic thermometer further includes means for maintaining a peak temperature reading displayed on the meter for a predetermined period of time after the probe temperature starts decreasing. That is, when a temperature is taken and the indicator needle records the same, that portion of the circuit set apart by the dotted line block 62 holds the needle at the temperature reading for a selected period of time. More particularly, the capacitor 63 is charged by a potential representative of a peak temperature reading, which capacitor applies such potential to a current amplifying section of the circuit, set-off by the dotted line block 65, for a period of time dependent upon the holding circuit.

The peak temperature holding circuit 62 includes an operational amplifier 64 and a diode 66 for applying the output potential of the measuring operational amplifier 54 to the capacitor 63 without voltage loss. More particularly, the positive primary input terminal of the operational amplifier 64 is connected to the output of amplifier 54, and the negative primary input terminal of the operational amplifier is connected in inverse feedback relationship to the diode 66. This arrangement will result in the same voltage being applied across capacitor 63 as is applied to the positive input terminal of amplifier 64 by the output of measuring amplifier 54.

The timer for controlling the length of time the capacitor 63 maintains a peak reading on the meter includes a capacitor 67 which is connected through a resistance 68 to the output of measuring amplifier 54. An operational amplifier 69 has its negative input terminal connected on the measuring amplifier output side of the resistor 68, and its positive input terminal connected on the other side of such resistance, whereby the voltage drop across such resistance 68 due to changes in the output of the measuring amplifier is applied between the negative and positive input terminals of the amplifier 69.

As mentioned before, the output of measuring amplifier 54 is inversely proportional to a change in the temperature of the probe. Thus, upon the temperature of the probe increasing, the voltage drop across resistor 68 and, hence, the voltage applied across the operational amplifier 69 will be more negative on the measuring amplifier output side of such resistor than on the other. The result is that the output of operational amplifier 69 will be made positive. The circuit is so designed that the output of such amplifier also goes positive when the temperature reaches a stabilized condition. More particularly, at such time the output of the measuring amplifier 54 is a constant with the result that there is no signal current flow through resistance 68. The resistance 77 has a value substantially above that of resistance 78. Thus, when the current flow through resistor 68 approaches zero, there is a larger voltage drop across resistance 77 due to the input currents of amplifier 69 then there is across resistance 78. Thus, the positive input terminal of the amplifier is positive relative to the negative primary input terminal, with the result that the amplifier output is made positive.

When the output of amplifier 69 is made to positive a proportionate charge is made to build-up through a diode 71 on a capacitor 72. Moreover, the base of the transistor 74 will be positive, with the result that such transistor is placed in a conducting condition. Such transistor is connected between the negative input terminal of an operational amplifier 76 and a control terminal of the amplifier so that when the transistor is on, the output of such amplifier 76 is, in effect, off so that its output does not affect the potential indicative of a temperature rise provided on capacitor 63 by amplifier 64. As shown, the negative input terminal of the amplifier 76 is connected to its operating current control terminal so that its operating voltage is more negative than that on the positive input terminal when the amplifier is on. This assures that the output of amplifier 76 is positive when it is on so that the capacitor 63 is driven positive after the selected period of time.

As discussed previously, the potential on capacitor 63 is applied to the current amplifier section for display as a temperature reading on the indicator 13'. When the temperature starts decreasing such as when the probe is removed from a patient whose temperature is being measured, the timing circuit is activated to begin the timing operation and thereafter rapidly remove charge from capacitor 63 so that the peak temperature reading is no longer held. More particularly, when the temperature of the probe starts decreasing, the capacitor 67 applies its potential across the resistor 68 to reverse the relative polarity of the input terminals of amplifier 69, with the result that the output of such amplifier goes negative.

It should be noted that the feedback loop including resistor 79 and diode 80 from the output of amplifier 69 to its positive primary input terminal causes a slight "toggle" action to be superimposed on the change of the amplifier output from negative to positive. The value of resistance 77 on the negative input terminal is selected to be appropriately of a large value to cause the same kind of toggling action of the amplifier output in its change from positive to negative. This prevents minute changes in the probe temperature from reversing the output polarity of amplifier 69. Unwanted erratic switching of the timing circuit is thus avoided.

When the output of amplifier 69 is made to go negative whenever the temperature of the probe is decreasing, the capacitor 72 is discharged over a period of time dependent upon the value of resistance 81. The charge on capacitor 72 controls the voltage across resistance 82 and, hence, on the base of transistor 74. Thus, discharge of such capacitor results in a lowering of the potential on the base to the point where current flow through such transistor is turned off. The turning off of such transistor will apply the positive potential of bus 33 to the positive input terminal of the amplifier 76 through resistance 83 and 84 to the negative input terminal through resistance 83 and diode 85. The output of the amplifier 76 will thus be made positive and will provide a positive voltage signal to capacitor 63 and provide a positive signal to the current amplifier 65 for driving the meter needle 16' off scale in the lower temperature direction. Thus, after the temperature of the diode 21' reaches its peak value and starts decreasing, the timing circuit holds the temperature reading provided by the needle 16' at such peak value for predetermined time after the temperature of the diode 21' starts decreasing, and then automatically causes the meter needle to be displaced from such temperature reading so that further temperature measurements can be made.

The timing circuit is also arranged so that if during a temperature reading hold, the battery cut-off circuit 41 indicates a low battery condition, the temperature hold is released and the needle is driven off scale as discussed. More particularly, the output of amplifier 42 in the battery cut-off portion of the circuit is applied through a diode 86 to the base of transistor 74 so that when such output becomes negative as discussed above, the transistor will become turned off.

The current amplifier circuit 65 includes an operational amplifier 87 which acts almost indentically to the operational amplifier 64, except that it acts to transmit the voltage applied to its positive input terminal to the positioning mechanism for needle 16' with the large current gain needed to operate such mechanism. More particularly, such amplifier controls the operation of a pair of NPN and PNP transistors 88 and 89 respectively, which are serially connected between the positive and negative input buses 33 and 34 of the circuit. That is, the output terminal of the amplifier 87 is connected to the base of each of such transistors to control current flow therethrough.

As is illustrated, the negative input terminal of the amplifier 87 is connected to the common emitter connection between the transistors 88 and 89. Thus, the amplifier 87 will act to set the voltage at the common emitter connection at the same voltage as that on its positive input terminal or, in other words, on the capacitor 63. However, because of the presence of the transistors, the current at such location will be greatly amplified relative to the potential current which could flow from the capacitor 63.

The temperature indicator is connected between the common bus 32 and the common emitter connection between the transistors 88 and 89. Thus, the high current signal voltage at such connection will also be applied to the indicator to control alignment of its needle 16' with temperature conditions as is desired.

Although not illustrated, it will be recognized that the electronic thermometer circuitry can include a conventional compensation circuit for assuring that the thermometer will be accurate over a wide range of ambient temperatues. The inclusion of such a compensation circuit is especially desirable for electronic thermometers to be used under the wide variations of temperature found outdoors.

It will be appreciated to those skilled in the art from the above description that the circuit of the electronic thermometer provides a precise and accurate translation of temperature changes of the probe semiconductive material to temperature readings on the indicator 13. It does so while requiring a minimum of power for operation and no non-automatic checking to be overlooked by an operator. And although the described embodiment includes all of the features provided by the circuitry as discussed above, it will readily be appreciated that the switching circuit for assuring that two differing dc potentials are always switched into a circuit simultaneously can find use in other environments. Thus, it is intended that the coverage afforded applicant be limited only by the claims.

I claim:

1. A semiconductor switching circuit for simultaneously connecting the separate terminals of two dc potentials respectively of positive and negative polarity to a load with a single pole of a switch comprising a load; a terminal providing negative potential; a terminal providing positive potential; a pair of transistors, one of which is a PNP transistor having its emitter connected to said terminal providing positive potential and its collector connected to said load, and the other of which is a NPN transistor having its emitter connected to said terminal providing negative potential and its collector connected to said load; a resistance; and a single pole of a switch, the bases of said transistors being connected to one another through said resistance and said single pole of a switch whereby the closing of said switch results in simultaneous current flow through said bases to turn said transistors on simultaneously for the simultaneous application of both of said potentionals to said load.

2. The semiconductor switching circuit of claim 1 wherein the emitter to base reverse breakdown voltage of each of said transistors is in excess of the voltage of the dc potential associated with either of said transistors whereby application to either of said transistors of the voltage of opposite polarity intended for either of said transistors will not turn on said transistor whereby said transistor will protect the circuit being switched from being subjected to said dc potential of opposite polarity.

* * * * *